(12) United States Patent  (10) Patent No.: US 8,264,455 B2
Fiebrink et al.  (45) Date of Patent: Sep. 11, 2012

(54) MAPPING OF PHYSICAL CONTROLS FOR SURFACE COMPUTING

(75) Inventors: Rebecca Fiebrink, Princeton, NJ (US); Dan Morris, Bellevue, WA (US); Meredith Morris, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 706 days.

(21) Appl. No.: 12/365,145

(22) Filed: Feb. 3, 2009

(65) Prior Publication Data
US 2010/0194677 A1 Aug. 5, 2010

(51) Int. Cl.
*G09G 5/00* (2006.01)
(52) U.S. Cl. ........ 345/156; 345/173; 345/174; 345/175; 345/184; 715/700; 715/750; 715/751
(58) Field of Classification Search .................. None
See application file for complete search history.

(56) References Cited

U.S. PATENT DOCUMENTS

| | | | | |
|---|---|---|---|---|
| 5,572,239 | A * | 11/1996 | Jaeger | 345/172 |
| 6,795,060 | B2 * | 9/2004 | Rekimoto et al. | 345/173 |
| 7,084,859 | B1 * | 8/2006 | Pryor | 345/173 |
| 7,327,376 | B2 | 2/2008 | Shen et al. | |
| 7,576,725 | B2 * | 8/2009 | Bathiche et al. | 345/156 |
| 7,671,851 | B1 * | 3/2010 | Pryor | 345/184 |
| 2006/0001645 | A1 * | 1/2006 | Drucker et al. | 345/156 |
| 2006/0181519 | A1 | 8/2006 | Vernier et al. | |
| 2007/0291008 | A1 | 12/2007 | Wigdor et al. | |
| 2009/0066638 | A1 * | 3/2009 | Moulios et al. | 345/156 |
| 2010/0079369 | A1 * | 4/2010 | Hartmann et al. | 345/156 |
| 2010/0095233 | A1 * | 4/2010 | Skourup et al. | 715/771 |

OTHER PUBLICATIONS

Albinsson, P.-A., S. Zhai, High precision touch screen interaction, Proc. of the 2003 Conf. on Human Factors in Computing Sys's, Apr. 2003, pp. 105-112, Ft. Lauderdale, Florida, USA.
Ballagas, R., M. Ringel, M. C. Stone, J. Borchers, iStuff: A physical user interface toolkit for ubiquitous computing environments, Proc. of the 2003 Conf. on Human Factors in Computing Systems, Apr. 2003, pp. 537-544, Ft. Lauderdale, Florida, USA.
Benko, H., A. D. Wilson, P. Baudisch, Precise selection techniques for multi-touch screens, Proc. of the 2006 Conf. on Human Factors in Computing Systems, Apr. 2006, pp. 1263-1272, Montréal, Québec, Canada.

(Continued)

*Primary Examiner* — William Boddie
*Assistant Examiner* — Christopher Thompson
(74) *Attorney, Agent, or Firm* — Lyon & Harr, LLP; Richard T. Lyon

(57) ABSTRACT

Physical controls on a physical controller device (PCD) are dynamically mapped to application controls for an application being executed on a computer having a touch-sensitive display surface. The computer identifies a PCD which has been placed by a user on the display surface and displays a mapping aura for the PCD. When the user touches an activate direct-touch button displayed within the mapping aura, the computer activates a mapping procedure for the PCD and displays a highlighted direct-touch button over each application control which is available to be mapped to the physical controls on the PCD. When the user selects a particular application control which is available to be mapped by touching the highlighted button residing over the control, the computer creates a dynamic mapping between the selected application control and a user-selected physical control on the PCD.

20 Claims, 8 Drawing Sheets

OTHER PUBLICATIONS

Block, F., C. Gutwin, M. Haller, H. Gellersen, M. Billinghurst, Pen and paper techniques for physical customisation of tabletop interfaces, 3rd IEEE Int'l Workshop on Horizontal Interactive Human Comp. Sys's, Oct. 2008, pp. 17-24, Amsterdam.

Crider, M., S. Bergner, T. N. Smyth, T. Möller, M. Tory, A. E. Kirkpatrick, D. Weiskopf, A mixing board interface for graphics and visualization applications, Proc. of the Graphics Interface 2007 Conf., May 2007, pp. 87-94 Montreal, Canada.

Dietz, P. H., D. Leigh, DiamondTouch: A multi-user touch technology, The 14th Annual ACM Symposium on User Interface Software and Technology, Nov. 2001, pp. 219-226, Disney's BoardWalk Inn Resort, Walt Disney World, Orlando, Florida, USA.

Forlines, C., D. Wigdor, C. Shen, R. Balakrishnan, Direct-touch vs. mouse input for tabletop displays, Proc. of the 2007 Conf. on Human Factors in Computing Systems, Apr. 28-May 3, 2007, pp. 647-656, San Jose, California, USA.

Greenberg, S., C. Fitchett, Phidgets: Easy development of physical interfaces through physical widgets, The 14th Annual ACM Symposium on User Interface Software and Technology, Nov. 2001, pp. 209-218, Disney's BoardWalk Inn Resort, Walt Disney World, Orlando, Florida, USA.

Ha, V., K. M. Inkpen, T. Whalen, R. L. Mandryk, Direct intentions: The effects of input devices on collaboration around a tabletop display, First IEEE Int'l Workshop on Horizontal Interactive Human-Computer Sys's., Tabletop 2006, Jan. 2006, pp. 177-184, Adelaide, Australia.

Hartmann, B., L. Yu, A. Allison, Y. Yang, S. R. Klemmer, Design as exploration: Creating interface alternatives through parallel authoring and runtime tuning, Proc. of the 21st Annual ACM Symposium on User Interface Software and Technology, pp. 91-100, Oct. 2008, Monterey, CA, USA.

Hinrichs, U., M. Sheelagh, T. Carpendale, S. D. Scott, E. Pattison, Interface currents: Supporting fluent collaboration on tabletop displays, Proc. of the 5th Int'l Symposium on Smart Graphics, Aug. 2005, pp. 185-197, Frauenwörth Cloister, Germany.

Hunt, A., R. Kirk, Radical user interfaces for real-time control, 25th IEEE Comp. Society Conf., Informatics: Theory and Practice for the New Millenium, Sep. 1999, pp. 2006-2012, Milan, Italy.

Ishii, H., B. Ullmer, Tangible bits: Towards seamless interfaces between people, bits and atoms, Conf. Proc. Human Factors in Computing Sys's., Mar. 1997, pp. 234-241, Atlanta, Georgia, USA.

Jordà, S., G. Geiger, M. Alonso, M. Kaltenbrunner, The reacTable: Exploring the synergy between live music performance and tabletop tangible interfaces, Proc. of the 1st Int'l Conf. on Tangible and Embedded Interaction, pp. 139-146, Feb. 2007, Baton Rouge, Louisiana, USA.

Jordà, S., M. Kaltenbrunner, G. Geiger, R. Bencina, The reacTable*, Proc. of the Int'l Comp. Music Conf., Aug. 2005, Barcelona, Spain.

Morris, M. J., Supporting effective interaction with tabletop groupware, Stanford University, Apr. 2006, Dissertation.

Morris, M. R., A. Paepcke, T. Winograd, J. A. Stamberger, TeamTag: Exploring centralized versus replicated controls for co-located tabletop groupware, Proc. of the 2006 Conf. on Human Factors in Computing Sys's., Apr. 2006, pp. 1273-1282, Montréal, Québec, Canada.

Müller-Tomfelde, C., C. Schremmer, Touchers and mousers: Commonalities and differences in co-located collaboration with multiple input devices, Proc. of the 2008 Conf. on Human Factors in Computing Systems, Apr. 2008, pp. 1149-1152, Florence, Italy.

Olwal, A., S. Feiner, Rubbing the Fisheye: Precise Touch-Screen Interaction with Gestures and Fisheye Views, Conf. Supp. of UIST'03, ACM Symposium on Uner Interface Software and Technology, Nov. 2003, pp. 83-84, Vancouver, BC.

Pangaro, G., D. Maynes-Aminzade, H. Ishii, The actuated workbench: computer-controlled actuation in tabletop tangible interfaces, Proc. of the 15th Annual ACM Symposium on User Interface Software and Tech., Oct. 2002, pp. 181-190, Paris, France.

Patten, J., B. Recht, H. Ishii, Interaction techniques for musical performance with tabletop tangible interfaces, Proc. of the Int'l Conf. on Advances in Comp. Entertainment Tech., Jun. 2006, Hollywood, California, USA.

Rekimoto, J., M. Saitoh, Augmented surfaces: A spatially continuous work space for hybrid computing environments, Proc. of the CHI '99 Conf. on Human Factors in Computing Sys's.: The CHI is the Limit, May 1999, pp. 378-385, Pittsburgh, PA, USA.

Rogers, Y., Y.-K. Lim, W. R. Hazlewood, Extending tabletops to support flexible collaborative interactions, First IEEE Int'l Workshop on Horizontal Interactive Human-Computer Sys's., Tabletop 2006, Jan. 2006, pp. 71-78, Adelaide, Australia.

Ryall, K., C. Forlines, C. Shen, M. R. Morris, K. Everitt, Experiences with and observations of direct-touch tabletops, First IEEE Int'l Workshop on Horizontal Interactive Human-Computer Sys's., Tabletop 2006, Jan. 2006, pp. 89-96, Adelaide, Australia.

Scott, S. D., K. D. Grant, R. L. Mandryk, System guidelines for co-located, collaborative work on a tabletop display, Proc. of the Eighth European Conf. on Comp. Supported Cooperative Work, Sep. 2003, pp. 159-178, Helsinki, Finland.

Scott, S. D., M. Sheelagh, T. Carpendale, K. M. Inkpen, Territoriality in collaborative tabletop workspaces, Proc. of the 2004 ACM Conf. on Comp. Supported Cooperative Work, Nov. 2004, pp. 294-303, Chicago, Illinois, USA.

Shen, C., F. Vernier, C. Forlines, M. Ringel: DiamondSpin: An extensible toolkit for around-the-table interaction, Proc. of the 2004 Conf. on Human Factors in Computing Sys's., Apr. 2004, pp. 167-174, Vienna, Austria.

Stewart, J., B. B. Bederson, A. Driun, Single display groupware: A model for co-present collaboration, Proc. of the CHI '99 Conf. on Human Factors in Computing Systems: The CHI is the Limit, May 1999, pp. 286-293, Pittsburgh, PA, USA.

Subramanian, S., D. Pinelle, J. H. M. Korst, V. Buil, Tabletop collaboration through tangible interactions, 16th IEEE Int'l Workshops on Enabling Technologies: Infrastructures for Collaborative Enterprises, Jun. 2007, pp. 412-417, Paris, France.

Ullmer, B., H. Ishii, The MetaDESK: Models and prototypes for tangible user interfaces, Proc. of the 10th Annual ACM Symposium on User Interface Software and Tech., ACM Symposium on User Interface Software and Technology, Oct. 1997, pp. 223-232, Banff, Alberta, Canada.

Virtualcomplexity.com, Design corner, retrieved Dec. 3, 2008 from http://designcorner.blinkr.net/visualcomplexity.com/?page=3.

Vogel, D., P. Baudisch, Shift: A technique for operating pen-based interfaces using touch, Proc. of the 2007 Conf. on Human Factors in Computing Sys's., Apr. 28-May 3, 2007, pp. 657-666, San Jose, California, USA.

Wanderley M. M., N. Orio, Evaluation of input devices for musical expression: Borrowing tools from HCI, Comp. Music Journal, Fall 2002, pp. 62-76, vol. 26, No. 3.

Wu, M., C. Shen, K. Ryall, C. Forlines, R. Balakrishnan, Gesture registration, relaxation, and reuse for multi-point direct-touch surfaces, First IEEE Int'l Workshop on Horizontal Interactive Human-Computer Sys's., Tabletop 2006, Jan. 2006, pp. 185-192, Adelaide, Australia.

* cited by examiner

MAPPING OF PHYSICAL CONTROLS FOR SURFACE COMPUTING

BACKGROUND

A surface computer generally employs a specialized graphical user interface (GUI) in which traditional GUI input devices such as a keyboard and mouse are replaced by a single, shared, durable, touch-sensitive display surface. Users interact directly with the display surface and applications displayed thereon using touch-based interactions including simple, natural and intuitive hand or finger gestures. Surface computers are now commercially available and are becoming increasingly popular for interactive groupware applications which operate in a collaborative, co-located multi-user setting.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Physical controls mapping (PCM) technique embodiments described herein generally involve dynamically mapping physical controls on repositionable physical controller devices to application controls for an application being executed on a computer associated with a shared, touch-sensitive display surface. In one exemplary embodiment the computer first recognizes and identifies a personal controller device (PCD), which has been placed by a user on the display surface and displays a mapping aura for the PCD. The PCD includes one or more physical controls. When the user touches an activate direct-touch button which is displayed within the mapping aura, the computer activates a mapping procedure for the PCD and displays a highlighted direct-touch button over each application control displayed on the display surface which is available to be mapped to the physical controls on the PCD. When the user selects a particular application control which is available to be mapped by touching the highlighted direct-touch button residing over the control, the computer creates a dynamic mapping between the selected application control and a user-selected physical control on the PCD.

DESCRIPTION OF THE DRAWINGS

The specific features, aspects, and advantages of the physical controls mapping (PCM) technique embodiments described herein will become better understood with regard to the following description, appended claims, and accompanying drawings where:

DETAILED DESCRIPTION

Figure 1:
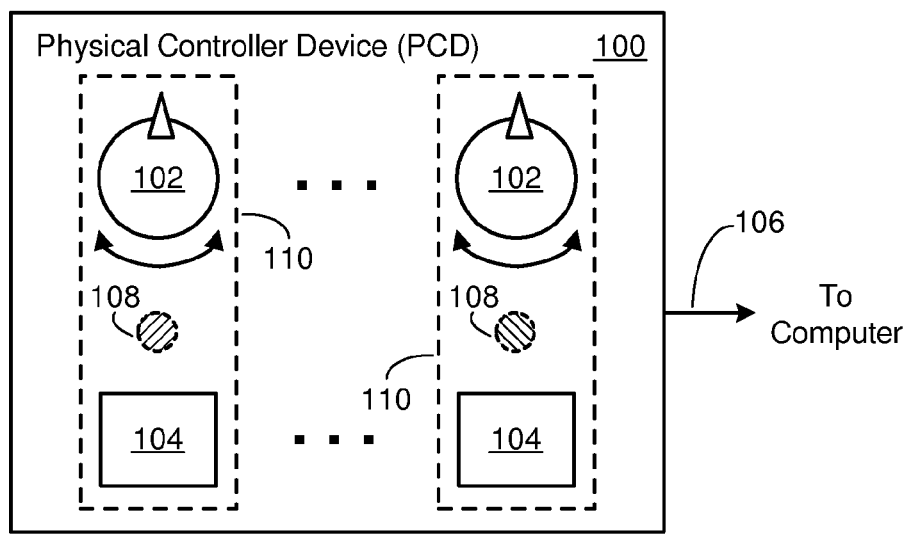
FIG. 1 is a diagram illustrating an exemplary embodiment of a physical controller device (PCD) associated with the PCM technique embodiments.

In the following description of physical controls mapping (PCM) technique embodiments reference is made to the accompanying drawings which form a part hereof, and in which are shown, by way of illustration, specific embodiments in which the PCM technique can be practiced. It is understood that other embodiments can be utilized and structural changes can be made without departing from the scope of the PCM technique embodiments.

The term "sector" is used herein to refer to a segmented region of a touch-sensitive display surface (herein also simply referred to as a "display surface") in which either a graphical user interface (GUI) and/or digital information is displayed, or a user-initiated function is performed. The term "physical controls" is used herein to refer to a variety of different user-selectable or user-adjustable physical control elements such as rotatable knobs, depressible buttons, switches, sliders and the like which provide users with the ability to interact with application controls which are mapped to the control elements in a fine-grained (i.e., precise) manner. The term "direct-touch" is used herein to refer to the users' aforementioned touch-based interactions with the display surface of the computer. The term "direct-touch widget" is used herein to refer to a virtual element of a GUI that provides users of the computer with the ability to interact with an application control that corresponds to the widget in a direct-touch manner. The term "mapping state" is used herein to refer to the mappings that exist at a particular point in time between the physical controls on a physical controller device (PCD) and the application controls for an application being executed on the computer.

1.0 Overview of Surface Computers

As described heretofore, a surface computer has a shared, durable, touch-sensitive display surface. Typically, this display is in the form of a table-top—although this need not be the case. For instance, a wall-mounted or floor-mounted configuration is also possible. For the purposes of this description, it will be assumed that a table-top configuration is being employed. However, it is not intended that the invention be limited to just table-top surface computing configurations. In most surface computers, a camera-based vision subsystem is utilized which recognizes and uniquely identifies physical objects that come in contact with the display surface. Such physical objects can include fingers, hands, paintbrushes and a variety of other real-world items. Such physical objects can also include tagged objects such as cell phones, digital cameras, personal digital assistant devices, and the like, which when placed on the display surface are automatically and uniquely identified, and can be automatically connected to the computer in cases where the tagged objects has a data communications interface. The users can employ direct-touch to "grab" digital information, edit its content, transfer the information between virtual objects, and transfer the information to and from tagged objects. The vision subsystem recognizes many points of contact with the display surface simultaneously, thus enabling a plurality of co-located users to simultaneously interact with and share control of applications being executed on the computer in a collaborative manner.

2.0 Mapping of Physical Controls for Surface Computing

Generally speaking, the PCM technique embodiments described herein involve integrating one or more high-precision physical controls on one or more PCDs into a surface computer. The physical controls operate in concert with direct-touch as a means to interact with and control an application being executed on the computer and displayed on the computer's display surface. As will be described in more detail hereafter, each user in a co-located group of collaborating users who are using the computer can dynamically map the physical controls on their PCD to controls which are available in the application (referred to herein as "application controls"). Each user can also dynamically map direct-touch widgets within a mapping aura associated with their PCD to the application controls. It is noted that the mappings are flexible in that each user can dynamically tailor their mapping to suit, for example, their own personal desires, their particular role in the group, the interaction style of other users in the group, and the particular user tasks associated with the application. Furthermore, once the physical controls and direct-touch widgets associated with a user's PCD are mapped by the user, these physical controls and direct-touch widgets can subsequently be re-mapped by the user as desired.

The PCM technique embodiments described herein are advantageous for a variety of reasons including, but not limited to, the following. The users can employ the physical controls to interact with the application controls which are mapped thereto with significantly greater precision than would otherwise be possible by employing direct-touch manipulations on the display surface. The physical controls also provide the users with an increased level of haptic feedback and visual feedback. The simultaneous availability of both direct-touch and physical controls to the users allows each user to dynamically choose the optimal way to interact with the application controls based on considerations such as the immediate task being performed in the application, the level of precision desired for the task, the user's particular role in the group, ergonomic convenience for the user, and visibility of the display surface to the collection of users in the collaborative setting. Awareness of mapping state across the different users is promoted since the physical controls are mapped to the application controls using direct-touch on the shared display surface. Since each user can modify the mapping of their physical controls to the application controls at any time, there is no upper bound on the number of different application controls each user can control using their physical controls. Visual cues are employed to indicate the current mapping state for each user so that the user does not have to memorize the mapping state each time they change it. Since each user's various mapping states can be saved, reloaded and shared with other users, user overhead is reduced and otherwise challenging collaborative behaviors are facilitated such as role switching and offline review of group dynamics.

The PCM technique embodiments described herein thus serve to enhance the aforementioned collaborative benefits of surface computers and the related efficiency of the users who use such computers. The PCM technique embodiments also serve to enhance the performance of interactive groupware applications for which dynamic multi-user collaboration, fine-grained control over a plurality of parameters, and feedback are desirable. Examples of such interactive groupware applications include media editing, gaming, graphic design, industrial design, print or Web layout, and data visualization, among others.

2.1 Physical Controller Device (PCD)

FIG. 1 illustrates one exemplary embodiment of a PCD associated with the PCM technique embodiments described herein. As exemplified in FIG. 1, the PCD 100 is a compact, repositionable box that includes the aforementioned physical controls 102/104. Generally speaking, one PCD is provided to each user in the co-located group of collaborating users who are using the computer.

Referring again to FIG. 1, the PCD 100 can include any number of physical controls of any type or combination of types. By way of example but not limitation, the PCD 100 can include one or more continuously adjustable physical controls (hereafter simply referred to as "continuous physical controls") such as rotatable knobs 102, sliders (not shown) and the like. Either in addition to or in place of these continuous physical controls, the PCD 100 can also include one or more discretely adjustable (e.g., on or off) physical controls (hereafter simply referred to as "discrete physical controls") such as depressible buttons 104, switches (not shown) and the like. In the situation where the PCD 100 includes both continuous and discrete physical controls, these physical controls can be grouped in pairs on the PCD.

Referring again to FIG. 1, the PCD 100 can optionally also include a different colored light 108 for each continuous physical control 102, or for each discrete physical control 104, or for each pair of continuous and discrete physical controls in the situation where the PCD includes both types of physical controls. In this case, each light 108 would be located adjacent to its associated physical control, or in between an associated pair of physical controls. By way of example but not limitation, the PCD 100 illustrated in FIG. 1 includes a plurality of groups 110 of physical controls, where each group has a different rotatable knob 102, a different depressible button 104, and a different colored light 108. The color of each light uniquely identifies its group.

Referring again to FIG. 1, a tag (not shown) is located on the bottom of each PCD 100. The tag uniquely identifies each PCD 100. When a particular user places their PCD 100 on the computer's display surface, the vision subsystem automatically deciphers the tag in order to uniquely identify the particular PCD. Each PCD 100 communicates with the computer via a communications link 106. Whenever a user manipulates any of the physical controls 102/104 on their PCD 100, the communications link 106 carries information to the computer specifying which particular physical control was manipulated (e.g., which knob 102 was turned or which button 104 was activated) and how it was manipulated (e.g., whether the knob was turned to the right or to the left and how much it was turned, or whether the button was pressed or released).

Referring again to FIG. 1, the PCD 100 can optionally be programmable such that it is capable of storing mapping states for its physical controls 102/104. In this case, whenever a user saves the current mapping state for their PCD 100 in the manner described in more detail hereafter, the current mapping state and an associated mapping history list can be written to the user's PCD via the communications link 106 and saved on the PCD. If the user subsequently places their PCD 100 on the display surface of a different computer, the PCD's current mapping state and mapping history list can be automatically transferred to the new computer via the communications link 106. The mapping history list is described in more detail hereafter.

In general, the PCD has a compact footprint so that a plurality of PCDs can fit on the display surface at the same time while still leaving a reasonable portion of the display surface un-obscured. As will be described in more detail hereafter, the un-obscured portion of the display surface is used to display a central editor sector including a direct-touch GUI for an application being executed on the computer. The un-obscured portion of the display surface can also be used to display a mapping aura for each of the PCDs residing on the display surface. It is noted that in addition to the PCD embodiment that has just been described, alternate PCD embodiments are also possible where, depending on the type of application being executed, the PCD can include, for example, a conventional audio mixing board, a conventional game pad, or other types of user controller devices. It is also noted that depending on the type of application being executed and the specific role of each user in the group, different users may employ different types of PCDs.

2.2 Display Surface Environment

The PCD technique embodiments will now be described in the context of a collaborative audio editing application which is being executed on the computer. It is noted that the audio editing application described hereafter is just one example of a variety of interactive groupware applications which are compatible with the PCM technique embodiments. Other exemplary applications which are compatible with the PCM technique embodiments have been described heretofore.

Generally speaking and as is appreciated in the art of media editing, audio editing applications are based on precisely controlling a large number of parameters. Even audio editing applications for novices, typically expose hundreds of continuously adjustable audio editing controls (hereafter simply referred to as "continuous editing controls") which a user ideally wants to precisely control. Exemplary continuous editing controls include, but are not limited to, volume level, pan, and parameters for a variety of audio effects such as chorus, distortion and reverberation. These audio editing controls are well known and need not be described at length here. Furthermore, audio editing applications typically employ a "track" editing paradigm where each recorded instrument or audio source may be stored and edited as an individual track. Although a combination of tracks is typically played at the same time for listening, users typically interact with each track's audio editing controls individually, thus further multiplying the application's effective number of editing controls. Additionally, since the task of audio editing is naturally collaborative, support for collaborative editing in audio editing applications is desirable.

Figure 2:
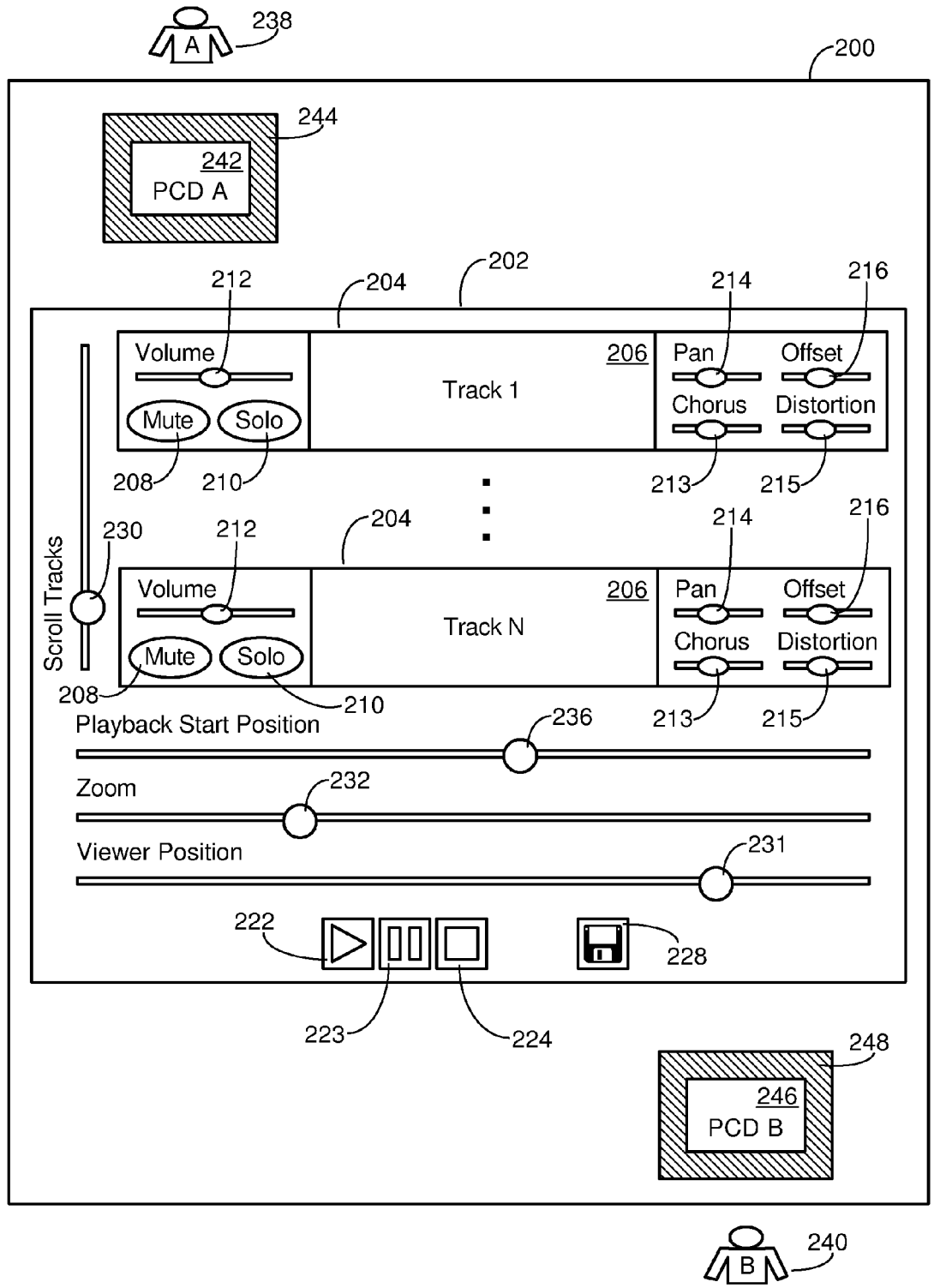
FIG. 2 is a diagram illustrating an exemplary embodiment of a touch-sensitive display surface environment associated with the PCM technique embodiments.

FIG. 2 illustrates an exemplary embodiment of a display surface environment associated with the PCM technique embodiments described herein. As exemplified in FIG. 2, the display surface 200 includes a central editor sector 202 within which a direct-touch GUI for the audio editing application is displayed. The direct-touch GUI is dynamically shared by the users 238 and 240, thus enabling the users to collaboratively plan, execute and observe the audio editing process. The shared direct-touch GUI generally includes a variety of direct-touch widgets each of which corresponds to a different parameter editing control, display control or playback control associated with the collaborative audio editing application. A more detailed description of each of these controls and their corresponding direct-touch widgets is provided hereafter.

As will be appreciated from the PCM technique embodiments described herein and referring again to FIG. 2, each user's 238/240 PCD 242/246 serves as a personal control "space" that supplements the shared direct-touch GUI. Each user 238/240 can dynamically choose to interact with the parameter editing controls, display controls and playback controls either via direct-touch manipulations of their corresponding direct-touch widgets, or via manipulations of mapped physical controls on their PCD 242/246. The PCM technique embodiments therefore provide each user 238/240 with a personalized replication of a selected subset of the available shared direct-touch widgets. Thus, the PCM technique embodiments accommodate user "territoriality" while allowing the users 238/240 freedom to dynamically change their positioning around the display surface 200.

Referring again to FIG. 2, the central editor sector 202 includes one or more track fields 204, where each track field generally corresponds to a different audio track (i.e., a different recorded instrument or audio source). More particularly, each track field 204 includes a track visualization sub-field 206 within which a waveform representation of the audio for a particular track is displayed. Each track field 204 also includes direct-touch widgets for track-specific parameter editing controls, where these controls are displayed alongside the track visualization sub-field 206. For example, in FIG. 2, a discretely adjustable mute parameter is controlled by a Mute direct-touch button 208 which allows the users 238/240 to disable (or re-enable) playback of the particular track. A discretely adjustable solo parameter is controlled by a Solo direct-touch button 210 which allows the users 238/240 to disable (or re-enable) playback of all the different tracks except for the particular track. A continuously adjustable volume parameter is controlled by a Volume direct-touch slider 212 which allows the users 238/240 to adjust the playback sound level for the particular track. A continuously adjustable pan parameter is controlled by a Pan direct-touch slider 214 which allows the users 238/240 to position the playback sound between a left audio output device and a right audio output device. A continuously adjustable offset parameter is controlled by an Offset direct-touch slider 216 which allows the users 238/240 to adjust the point in time when the particular track begins playing relative to the playback of the other tracks. A continuously adjustable chorus parameter is controlled by a Chorus direct-touch slider 213 which allows the users 238/240 to adjust the level of chorus effect that is applied to the particular track. Finally, a continuously adjustable distortion parameter is controlled by a Distortion direct-touch slider 215 which allows the users 238/240 to adjust the level of distortion effect that is applied to the particular track.

Referring again to FIG. 2, the central editor sector 202 also includes direct-touch widgets for non-track-specific playback controls and parameter editing control. For example, as shown in FIG. 2, the users 238/240 can discretely initiate playback of the audio tracks by touching a Play direct-touch button 222. The users 238/240 can discretely pause the playback of the audio tracks by touching a Pause direct-touch button 223. The users 238/240 can discretely stop the playback of the audio tracks by touching a Stop direct-touch button 224. The users 238/240 can continuously adjust the audio tracks playback position (i.e., the point in time from which the audio tracks are played back when the Play direct-touch button 222 is touched) via a Playback Start Position direct-touch slider 236. The users 238/240 can discretely save the changes they have made to the track-specific parameter editing controls 212-216, 208 and 210 described heretofore, the playback position 236, and the display controls described hereafter by touching a Save direct-touch button 228.

Referring again to FIG. 2, the central editor sector 202 also includes direct-touch widgets for non-track-specific display controls. For example, a continuously adjustable track scrolling parameter is controlled by a Scroll Tracks direct-touch slider 230 which allows the users 238/240 to vertically scroll through all of the audio tracks to select the tracks that are displayed within the track fields 204. A continuously adjustable zoom parameter is controlled by a Zoom direct-touch slider 232 which allows the users 238/240 to zoom in and zoom out on the waveform representations displayed within the track visualization sub-fields 206. A continuously adjustable viewer position parameter is controlled by a Viewer Position direct-touch slider 231 which allows the users 238/240 to horizontally scroll the waveform representations displayed within the track visualization sub-fields 206.

The default size of each of the direct-touch widgets can be the size of a typical adult fingertip to facilitate easy user manipulation of the controls which are mapped thereto. The users can change the size, position, and orientation of the central editor sector using direct-touch manipulations on the exterior border of the sector. Whenever the users change the size of the central editor sector, the size of each of the direct-touch widgets are correspondingly made larger or smaller.

Referring again to FIG. 2, whenever a user A 238 places their PCD 242 on the display surface 200, the computer automatically recognizes and identifies user A's PCD 242 and displays a first mapping aura 244 for user A's PCD. The configuration of a mapping aura is tailored to its associated PCD, and is generated by the computer based on information it receives when a user places the PCD on the display surface. If another user B 240 places their PCD 246 on the display surface 200 at the same time user A's PCD 242 is on the display surface 200, the computer will automatically recognize and identify user B's PCD 246 and will display a second mapping aura 248 for user B's PCD. Implementations of the contents and operation of the mapping auras 244 and 248 are described hereafter. It is noted that additional users (not shown) can place their PCDs (not shown) on the display surface 200 at the same time user A's PCD 242 and user B's PCD 246 reside on the display surface and the computer will automatically recognize and identify each additional user's PCD and will display an additional mapping aura (not shown) for each additional user's PCD. In the display surface environment exemplified in FIG. 2 the mapping aura 244/248 for each PCD 242/246 is displayed around the perimeter of the PCD. Each user is free to dynamically move their PCD to a new location on the display surface as desired. The computer automatically tracks any movement of the PCDs residing on the display surface and moves the mapping auras accordingly to track the PCDs' movement.

Figure 3:
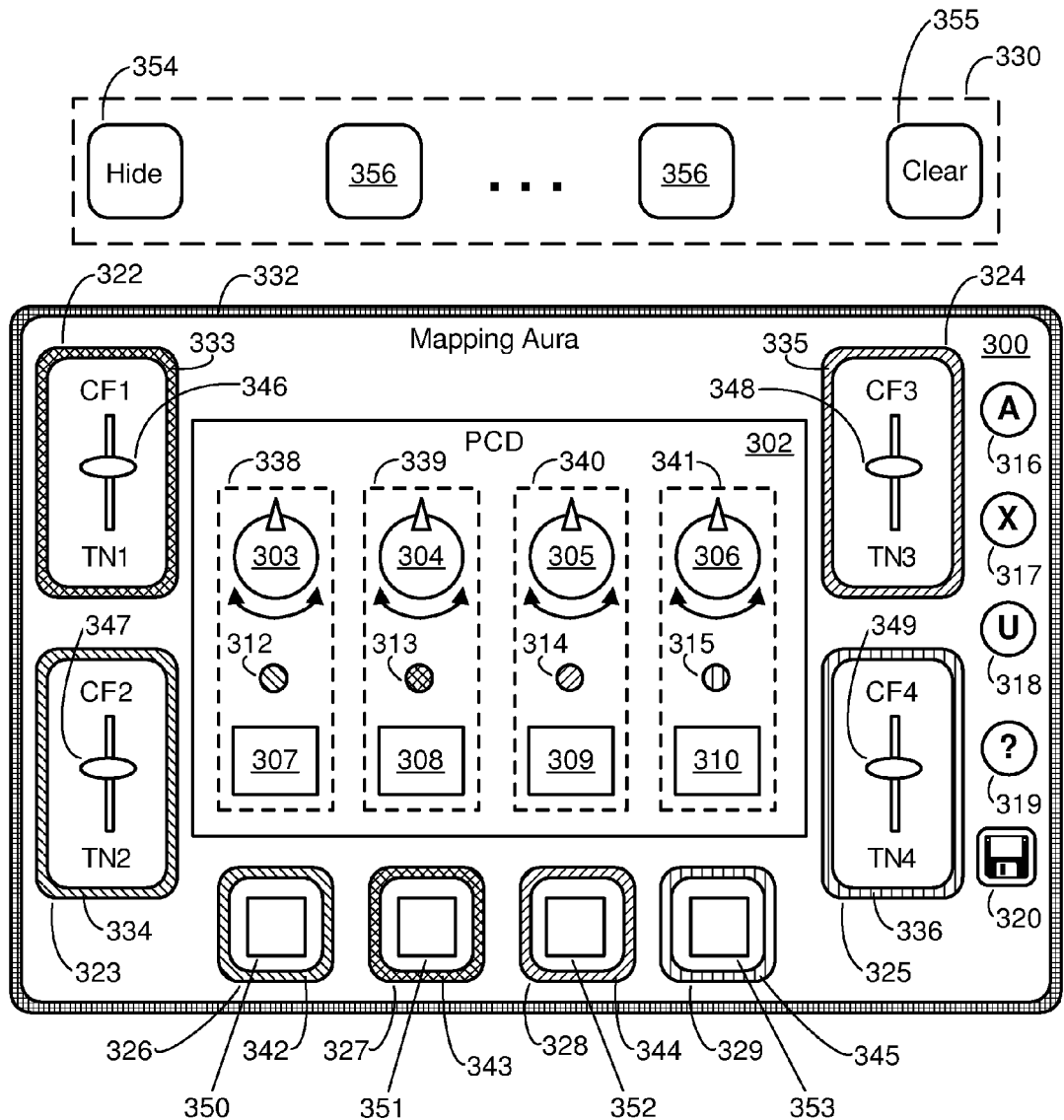
FIG. 3 is a diagram illustrating an exemplary embodiment of a mapping aura and optional clipboard for an exemplary PCD which is placed on the display surface.

FIG. 3 illustrates an exemplary embodiment of a mapping aura and an optional clipboard for an exemplary PCD which is placed on the display surface. Generally speaking and as exemplified in FIG. 3, the mapping aura 300 includes a plurality of mapping control direct-touch buttons 316-320, a plurality of continuous virtual "slots" 322-325, and a plurality of discrete virtual slots 326-329, each of which are interactive and can be manipulated by direct-touch. As will be described in more detail hereafter, the mapping control direct-touch buttons 316-320 are generally utilized by the PCD's 302 user to manage a procedure for dynamically mapping the aforementioned parameter editing controls, display controls and playback controls to the various physical controls 303-310 on the PCD.

The PCD 302 exemplified in FIG. 3 includes four groups 338-341 of physical controls, where each group has a different rotatable knob 303-306, a different depressible button 307-310, and a different colored light 312-315. The color of each light 312-315 uniquely identifies the particular knob 303-306 and button 307-310 in its group 338-341 (i.e., each light has a different color). Each of the continuous virtual slots 322-325 corresponds to a different continuous physical control 303-306 on the PCD 302. A highlighted halo border 333-336 is displayed around the perimeter of each of the continuous virtual slots 322-325, and each of these halo borders has a different color which matches the color of the LED 312-315 for the continuous physical control 303-306 that corresponds to the continuous virtual slot. By way of example but not limitation, in the mapping aura 300 and PCD 302 illustrated in FIG. 3 the bottom-left continuous virtual slot 323 corresponds to the left-most knob 303 and the halo border 334 around this slot has a color which matches the left-most LED 312. The top-left continuous virtual slot 322 corresponds to the left-center knob 304 and the halo border 333 around this slot has a color which matches the left-center LED 313. The top-right continuous virtual slot 324 corresponds to the right-center knob 305 and the halo border 335 around this slot has a color which matches the right-center LED 314. Finally, the bottom-right continuous virtual slot 325 corresponds to the right-most knob 306 and the halo border 336 around this slot has a color which matches the right-most LED 315.

Referring again to FIG. 3, each of the discrete virtual slots 326-329 corresponds to a particular discrete physical control 307-310 on the PCD 302. A highlighted halo border 342-345 is displayed around the perimeter of each of the discrete virtual slots 326-329, and each of these halo borders has a different color which matches the color of the LED 312-315 for the discrete physical control 307-310 that corresponds to the discrete virtual slot. By way of example but not limitation, in the mapping aura 300 and PCD 302 illustrated in FIG. 3, the left-most discrete virtual slot 326 corresponds to the left-most button 307 and the halo border 342 around this slot has a color which matches the left-most LED 312. The left-center discrete virtual slot 327 corresponds to the left-center button 308 and the halo border 343 around this slot has a color which matches the left-center LED 313. The right-center discrete virtual slot 328 corresponds to the right-center button 309 and the halo border 344 around this slot has a color which matches the right-center LED 314. Finally, the right-most discrete virtual slot 329 corresponds to the right-most button 310 and the halo border 345 around this slot has a color which matches the right-most LED 315.

Referring again to FIG. 3, the optional clipboard 330 generally includes a Hide direct-touch button 354, a Clear direct-touch button 355 and a plurality of virtual clipboard slots 356, each of which are interactive and can be manipulated by direct-touch. The operation of the virtual clipboard slots 356 is described in more detail hereafter. When a user touches the Hide direct-touch button 354 the clipboard 330 will be removed from the display surface. A user can cause the clipboard 330 to be re-displayed on the display surface by touching an activate direct-touch button 316 which is displayed within the mapping aura 300. When a user touches the Clear direct-touch button 355, the contents of each of the virtual clipboard slots 356 will be cleared.

Generally speaking and referring again to FIGS. 2 and 3, each continuous physical control 303-306 can be mapped by a user 238/240 to any one of the aforementioned direct-touch sliders 212-216, 230-232 and 236 in the central editor sector 202. Additionally, each discrete physical control 307-310 can be mapped by a user 238/240 to any one of the aforementioned direct-touch buttons 208, 210, 222-224 and 228 in the central editor sector 202.

Referring again to FIGS. 2 and 3, when a particular continuous physical control 303-306 is mapped to a particular track-specific direct-touch slider 212-216 in the central editor sector 202, the interior of the particular continuous virtual slot 322-325 corresponding to the continuous physical control will be populated with a secondary direct-touch slider 346-349 and a pair of labels CF and TN which uniquely identify the mapped slider 212-216 by its function (CF) and the particular track name (TN) with which it is associated. It is noted that the secondary direct-touch slider 346-349 is fully functional in that it can also be used to interact with the application control corresponding to the mapped track-specific direct-touch slider 212-216. By way of example but not limitation, if the left-most knob 303 on a given PCD 302 is mapped to the aforementioned Volume direct-touch slider 212 for Track 1 206 which happens to be a Flute track, the interior of the corresponding continuous virtual slot 323 will be populated with a secondary direct-touch slider 347, a "Volume" label will be displayed adjacent to the slider (i.e., CF2=Vol) and a "Flute" label will also be displayed adjacent to the slider (i.e., TN2=Flute). Whenever the value of a track-specific continuous editing control 212-216 changes, regardless of how the change was initiated, each of the GUI representations of the control will change in synchrony. By way of example but not limitation, if a user 238/240 employs direct-touch in the central editor sector 202 to manipulate the Volume direct-touch slider 212 for the Flute track 206, the position of the secondary slider 347 in the corresponding continuous virtual slot 323 of the mapping aura 300 will be simultaneously updated to reflect the change. By way of further example, if the user 238/240 employs the left-most knob 303 on their PCD 302 to manipulate the volume parameter for the Flute track 206, both the position of the secondary slider 347 in the corresponding continuous virtual slot 323 of the mapping aura 300, and the position of the Volume direct-touch slider 212 in the corresponding track field 204 of the central editor sector 202 will be simultaneously updated to reflect the change.

Referring again to FIGS. 2 and 3, when a particular continuous physical control 303-306 is mapped to a particular non-track-specific direct-touch slider 230-232 and 236 in the central editor sector 202, the interior of the particular continuous virtual slot 322-325 corresponding to the continuous physical control will be populated with a secondary direct-touch slider 346-349 and a label CF which uniquely identifies the mapped slider 230-232 and 236 by its function. It is noted that the secondary direct-touch slider 346-349 is fully functional in that it can also be used to interact with the application control corresponding to the mapped non-track-specific direct-touch slider 230-232. By way of example but not limitation, if the right-center knob 305 on a given PCD 302 is mapped to the aforementioned Zoom direct-touch slider 232, the interior of the corresponding continuous virtual slot 324 will be populated with a secondary direct-touch slider 348 and a "Zoom" label will be displayed adjacent to the slider (i.e., CF3=Zoom). In this case no second label TN3 will be displayed adjacent to the slider 348. Whenever the value of a non-track-specific continuous display control 230-232 or continuous playback control 236 changes, regardless of how the change was instantiated, each of the GUI representations of the control will change in synchrony. By way of example but not limitation, if a user 238/240 employs direct-touch in the central editor sector 202 to manipulate the Zoom direct-touch slider 232, the position of the secondary slider 348 in the corresponding continuous virtual slot 324 of the mapping aura 300 will be simultaneously updated to reflect the change. By way of further example, if the user 238/240 employs the right-center knob 305 on their PCD 302 to manipulate the zoom parameter, both the position of the secondary slider 348 in the corresponding continuous virtual slot 324 of the mapping aura 300, and the position of the Zoom direct-touch slider 232 in the central editor sector 202 will be simultaneously updated to reflect the change.

Referring again to FIGS. 2 and 3, when a particular discrete physical control 307-310 is mapped to a particular non-track-specific direct-touch button 222-224 and 228 in the central editor sector 202, the interior of the particular discrete virtual slot 326-329 corresponding to the discrete physical control will be populated with a secondary direct-touch button 350-353 resembling the central editor sector button 222-224 and 228 to which it is mapped. It is noted that the secondary direct-touch button 350-353 is fully functional in that it can also be used to interact with the application control corresponding to the mapped non-track-specific direct-touch button 222-224. By way of example but not limitation, if the left-most button 307 on a given PCD 302 is mapped to the aforementioned Play direct-touch button 222, the interior of the corresponding discrete virtual slot 326 will be populated with a secondary direct-touch button 350 resembling the Play direct-touch button 222.

Referring again to FIGS. 2 and 3, when a particular discrete physical control 307-310 is mapped to a particular track-specific direct-touch button 208/210 in the central editor sector 202, the interior of the particular discrete virtual slot 326-329 corresponding to the discrete physical control will be populated with a secondary direct-touch button 350-353 resembling the central editor sector button 208/210 to which it is mapped and a pair of labels (not shown) which uniquely identify the mapped button 208/210 by its function and the particular track name with which it is associated. It is noted that the secondary direct-touch button 350-353 is fully functional in that it can also be used to interact with the application control corresponding to the mapped track-specific direct-touch button 208/210. By way of example but not limitation, if the right-most button 310 on a given PCD 302 is mapped to the aforementioned Mute direct-touch button 208 for Track 1 206 which happens to be a Flute track, the interior of the corresponding discrete virtual slot 329 will be populated with a secondary direct-touch button 353 resembling the Mute direct-touch button 208, a "Mute" label (not shown) will be displayed on one side of the button 353 and a "Flute" label will be displayed on another side of the button 353.

2.3 Mapping Procedure

Referring again to FIGS. 2 and 3, this section provides a description of embodiments of a procedure for dynamically mapping the aforementioned physical controls 303-310 on each user's PCD 302 to the aforementioned application controls (which include the aforementioned track-specific parameter editing controls 212-216, 208 and 210, non-track-specific parameter editing control 228, display controls 230-232, and playback controls 222-224 and 236). It is noted that when the collaborative audio editing application is executed for the first time on the computer, no mapping exists between the application controls and physical controls. Therefore, when a first user 238 places a first PCD 242 on the computer's display surface for the first time, the aforementioned continuous virtual slots 322-325 and discrete virtual slots 326-329 of the first mapping aura 244 which is displayed for the first PCD will be blank.

Figure 7A:
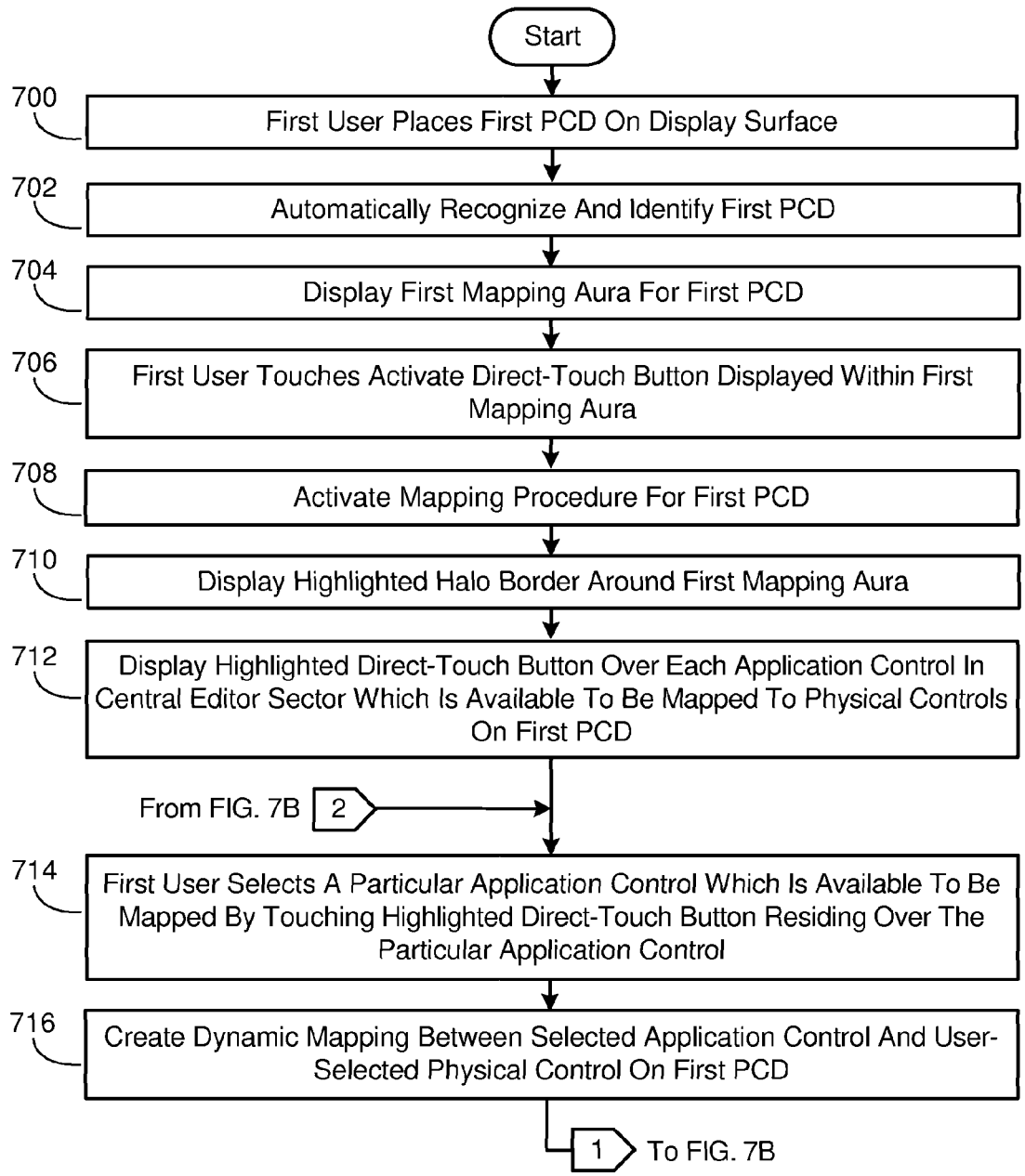
FIGS. 7A and 7B are a flow diagram illustrating an exemplary embodiment, in simplified form, of a process for dynamically mapping physical controls on PCDs to application controls for an application being executed on a computer.
Figure 7B:
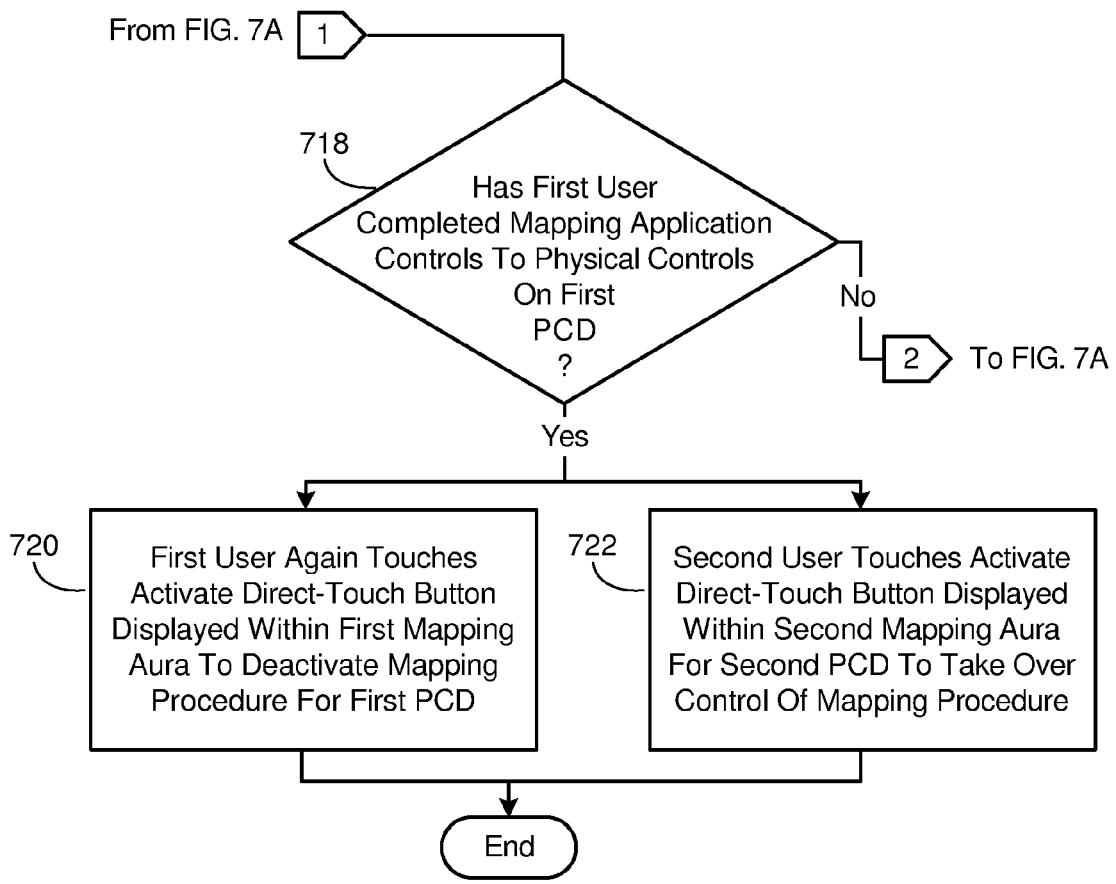

FIGS. 7A and 7B illustrate an exemplary embodiment, in simplified form, of a process for dynamically mapping the physical controls on each user's PCD to the application controls. As exemplified in FIG. 7A and referring again to FIGS. 2 and 3, the process starts in block 700 where the first user 238 places a first PCD 242 on the display surface 200. The computer then automatically recognizes and identifies the first PCD 242 (block 702). The computer then displays a first mapping aura 244 for the first PCD 242 (block 704). The first user 238 can then touch an activate direct-touch button 316 which is displayed within the first mapping aura 244 (block 706), upon which the computer activates a mapping procedure for the first PCD 242 (block 708), displays a highlighted halo border 332 around the first PCD's mapping aura 244 (block 710), and displays a highlighted direct-touch button (not shown) over each of the application controls 212-216, 208/210, 222-224, 228, 230-232 and 236 in the central editor sector 202 which are available to be mapped to the physical controls 303-310 on the first PCD 242 (block 712).

Referring again to FIGS. 2, 3, 7A and 7B, for each particular application control that the first user 238 wants to map, the first user can then select the particular application control by touching the highlighted direct-touch button residing over the particular application control (block 714). The computer then creates a dynamic mapping between the selected application control and a user-selected physical control 303-310 on the first PCD 242 (block 716). The first user 238 can repeat blocks 714 and 716 as necessary to map additional application controls to additional physical controls 303-310 on the first PCD 242. Once the first user has completed mapping application controls to physical controls on the first PCD (block 718), one of the following two things can happen.

Referring again to FIGS. 2, 3 and 7B, upon the first user 238 again touching the activate direct-touch button 316 displayed within the first mapping aura 244 (block 720), the computer performs operations including the following. The computer deactivates the mapping procedure for the first PCD 242, removes the aforementioned highlighted halo border 332 from around the first mapping aura 244, and returns the application to its normal operating mode. In the PCM technique embodiment described in more detail hereafter which employs the aforementioned optional clipboard 330, the computer also closes the clipboard for the first mapping aura 244.

Alternatively, and referring again to FIGS. 2, 3 and 7B, assuming a second user 240 has already placed a second PCD 246 on the display surface 200 and the computer has already automatically recognized and identified the second PCD and displayed a second mapping aura 248 for the second PCD, the second user can take over control of the mapping procedure by touching an activate direct-touch button 316 displayed within the second mapping aura (block 722). This results in the computer performing operations including the following. The computer deactivates the mapping procedure for the first PCD 242 and removes the highlighted halo border 332 from around the first mapping aura 244. The computer also activates a mapping procedure for the second PCD 246 and displays a highlighted halo border 332 around the second mapping aura 248. The computer also transfers the current mapping state for the first PCD 242 to the second mapping aura 248. Additionally, in a PCM technique embodiment described in more detail hereafter which employs the optional clipboard 330, the computer also performs operations including the following. The computer closes the clipboard 330 for the first mapping aura 244 and displays a clipboard for the second mapping aura 248. Additionally, for each of the application controls which were originally selected by the first user 238 from the central editor sector 202 and copied into the virtual clipboard slots 356 in the first user's clipboard 330 as described hereafter, the computer duplicates these application controls in the virtual clipboard slots in the second user's 240 clipboard.

It is noted that additional users can also map the physical controls on their PCD to their desired application controls using the PCM technique embodiment exemplified in FIGS. 7A and 7B and described heretofore.

2.3.1 Creating Mapping Using Clipboard

Figure 4:
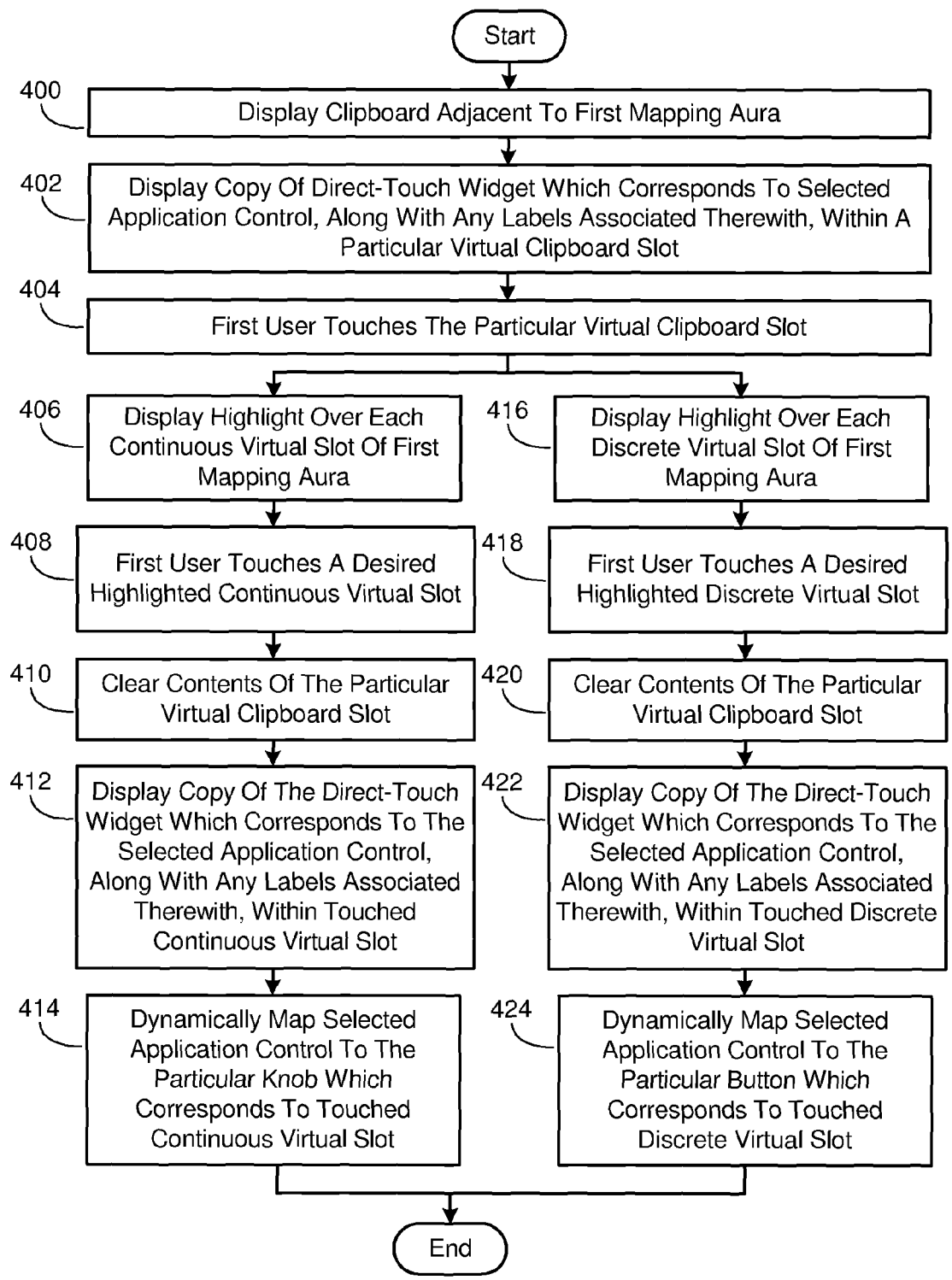
FIG. 4 is a flow diagram illustrating one embodiment, in simplified form, of a process for creating a dynamic mapping between a selected application control and a user-selected physical control on the PCD, where this embodiment employs a clipboard.

FIG. 4 illustrates one embodiment, in simplified form, of the aforementioned operation of creating a dynamic mapping between a selected application control and a user-selected physical control on the first PCD (refer to FIG. 7A block 716), where this embodiment employs the clipboard. It is noted that this procedure is applicable to each user performing dynamic mapping, however a first user will be used as an example. As exemplified in FIG. 4 and referring again to FIGS. 2 and 3, the process starts in block 400 where the computer displays a clipboard 330 adjacent to the first mapping aura 244. The computer then displays a copy of the direct-touch button or slider (also simply referred to herein as a "direct-touch widget") associated with the selected application control, along with any labels associated therewith, within a particular virtual clipboard slot 356 (block 402).

Referring again to FIGS. 2-4, in the case where the selected application control is continuously adjustable, upon the first user 238 touching the particular virtual clipboard slot 356 (block 404), the computer displays a highlight over each of the continuous virtual slots 322-325 of the first mapping aura 244 (block 406). Upon the first user 238 touching a desired highlighted continuous virtual slot 322-325 (block 408), the computer performs operations including the following. The computer clears the contents of the particular virtual clipboard slot 356 (block 410). The computer also displays a copy of the direct-touch widget 346-349 which corresponds to the selected application control, along with any labels (CF and TN) associated therewith, within the touched continuous virtual slot (block 412). The computer also dynamically maps the selected application control to the particular knob 303-306 which corresponds to the touched continuous virtual slot (block 414). It is noted that this mapping allows the first user to dynamically choose to interact with the selected application control either via the particular knob, the direct-touch widget displayed within the central editor sector which corresponds to the selected application control, or the copy of the direct-touch widget displayed within the touched continuous virtual slot.

Referring again to FIGS. 2-4, in the case where the selected application control is discretely adjustable, upon the first user 238 touching the particular virtual clipboard slot 356 (block 404), the computer displays a highlight over each of the discrete virtual slots 326-329 of the first mapping aura 244 (block 416). Upon the first user 238 touching a desired highlighted discrete virtual slot 326-329 (block 418), the computer performs operations including the following. The computer clears the contents of the particular virtual clipboard slot 356 (block 420). The computer also displays a copy of the direct-touch widget 350-353 which corresponds to the selected application control, along with any labels associated therewith, within the touched discrete virtual slot (block 422). The computer also dynamically maps the selected application control to the particular button 307-310 which corresponds to the touched discrete virtual slot (block 424). It is noted that this mapping allows the first user to dynamically choose to interact with the selected application control either via the particular button, the direct-touch widget displayed within the central editor sector which corresponds to the selected application control, or the copy of the direct-touch widget displayed within the touched discrete virtual slot.

2.3.2 Creating Mapping Without Using Clipboard

Figure 5:
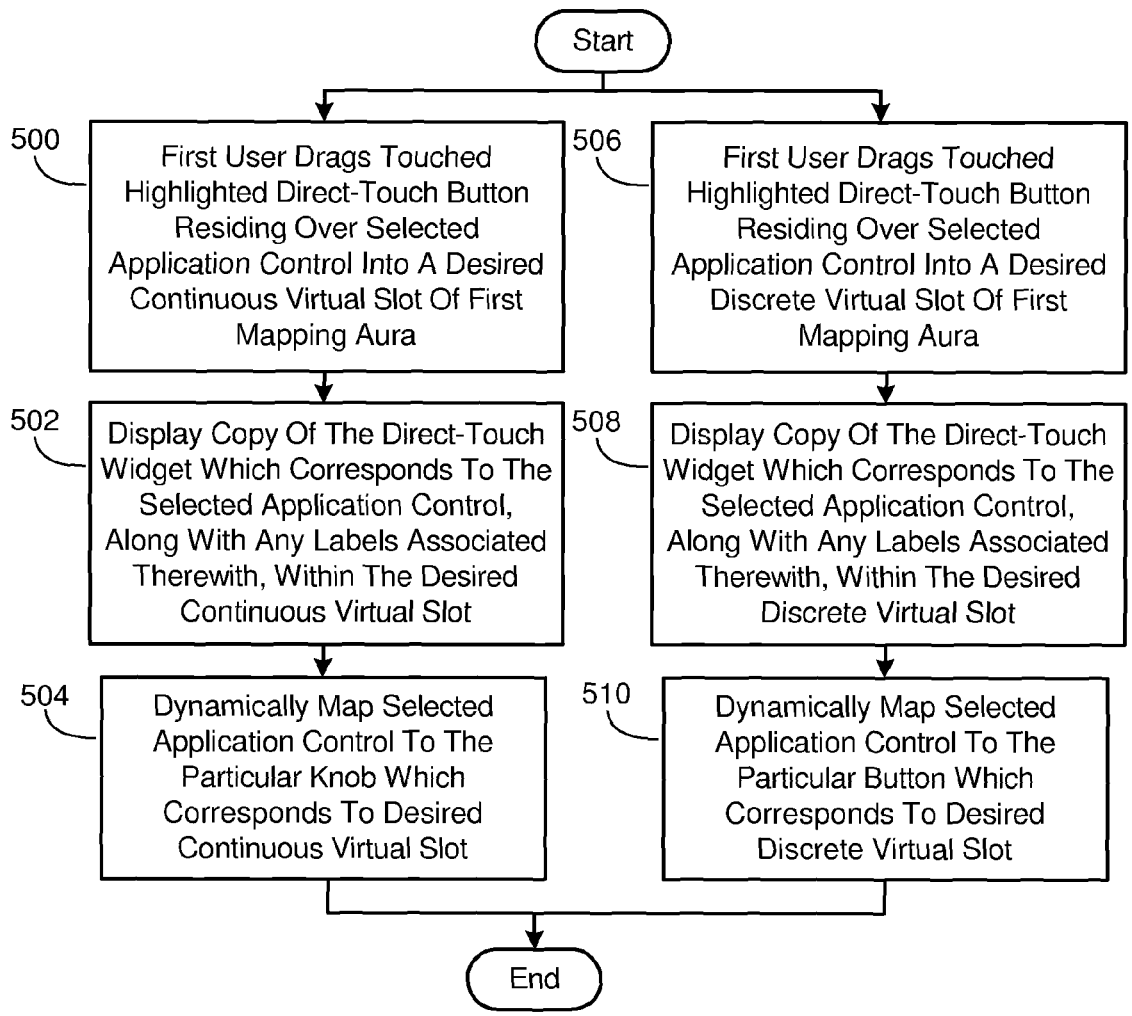
FIG. 5 is a flow diagram illustrating another embodiment, in simplified form, of a process for creating a dynamic mapping between a selected application control and a user-selected physical control on the PCD, where this embodiment does not employ the clipboard.

FIG. 5 illustrates another embodiment, in simplified form, of the aforementioned operation of creating a dynamic mapping between a selected application control and a user-selected physical control on the first PCD (refer to FIG. 7A block 716), where this embodiment does not employ the clipboard. It is noted that this procedure is applicable to each user performing dynamic mapping, however a first user will be used as an example. As exemplified in FIG. 5 and referring again to FIGS. 2 and 3, in the case where the selected application control is continuously adjustable, the process starts in block 500 where the first user 238 drags the touched highlighted direct-touch button residing over the selected application control into a desired continuous virtual slot 322-325 of the first mapping aura 244. The computer then displays a copy of the direct-touch widget 346-349 which corresponds to the selected application control, along with any labels (CF and TN) associated therewith, within the desired continuous virtual slot 322-325 (block 502). The computer then dynamically maps the selected application control to the particular knob 303-306 which corresponds to the desired continuous virtual slot 322-325 (block 504). It is noted that this mapping allows the first user to dynamically choose to interact with the selected application control either via the particular knob, the direct-touch widget displayed within the central editor sector which corresponds to the selected application control, or the copy of the direct-touch widget displayed within the desired continuous virtual slot.

Referring again to FIGS. 2, 3 and 5, in the case where the selected application control is discretely adjustable, the process starts in block 506 where the first user 238 drags the touched highlighted direct-touch button residing over the selected application control into a desired discrete virtual slot 326-329 of the first mapping aura 244. The computer then displays a copy of the direct-touch widget 350-353 which corresponds to the selected application control, along with any labels associated therewith, within the desired discrete virtual slot 326-329 (block 508). The computer then dynamically maps the selected application control to the particular button 307-310 which corresponds to the desired discrete virtual slot 326-329 (block 510). It is noted that this mapping allows the first user to dynamically choose to interact with the selected application control either via the particular button, the direct-touch widget displayed within the central editor sector which corresponds to the selected application control, or the copy of the direct-touch widget displayed within the desired discrete virtual slot.

2.3.3 Other Mapping Procedure Features

This section describes embodiments of additional mapping procedure features which apply to both the aforementioned process embodiment which uses the clipboard (described in section 2.3.1) and the process embodiment which does not use the clipboard (described in section 2.3.2).

Referring again to FIG. 3, it is noted that only one user and their PCD 302 can have control over the mapping procedure at any point in time, where this control is visually indicated to the other users by the highlighted halo border 332 which is displayed around the mapping aura 300 for the controlling PCD. A save direct-touch button 320 is displayed within the mapping aura 300 which allows the user of the PCD 302 within the mapping aura to save the current mapping state for the PCD (i.e., which physical controls 303-310 on the PCD are mapped to which application controls on the computer). When a user touches the save button 320, besides the current mapping state for their PCD 302 being saved on the computer, the current mapping state is appended to a mapping history list which is also saved on the computer. The mapping history list (not shown) thus includes a chronological listing of each of the saved mapping states. The mapping history list can be displayed within a scrollable sector (not shown) adjacent to the mapping aura 300. A user can employ direct-touch to scroll through the displayed mapping history list and load any of the saved mapping states (i.e., revert the physical controls mapping to a previously saved mapping state).

Referring again to FIG. 3, it is further noted that once a user has saved the current mapping state for their PCD 302 and deactivated their current mapping procedure, they can reactivate the mapping procedure for their PCD at any later time by again touching the activate direct-touch button in their mapping aura 300. This will allow the user to modify the current mapping state for their PCD 302. A delete direct-touch button 317 is also displayed within the mapping aura 300 which allows the user of the PCD 302 within the mapping aura to delete a particular mapping which was previously created between an application control and a physical control on their PCD. An undo direct-touch button 318 also displayed within the mapping aura 300 allows a user to undo such a deletion, or to undo a physical controls mapping that was just created.

Referring again to FIG. 2, it is yet further noted that a first user 238 can share either the current saved mapping state or any previously saved mapping state for their PCD 242 with a second user 240 in the following manner. The first user 238 can employ direct touch to drag the mapping history list (not shown) for their PCD 242 into the second mapping aura 248 for the second user's PCD 246, after which the computer "docks" the dragged history list to the second mapping aura, and the computer highlights (not shown) both the dragged history list and the second mapping aura to visually indicate this docking. As long as the dragged history list is docked to the second mapping aura, any saved mapping state which is selected from the dragged history list will be loaded for the second PCD.

Referring again to FIG. 3, it is yet further noted that the mapping aura 300 can include a mechanism to query the different points of control which exist for a particular application control (such as a direct-touch widget in the central editor sector, or a physical control 303-310 on one or more PCDs 302). More particularly, when a user touches a query direct-touch button 319 which is also displayed within the mapping aura 300 for their PCD 302, and the user then touches a particular virtual slot 322-329 of the mapping aura for their PCD, the computer will flash each direct-touch widget wherever it is displayed on the display surface that corresponds to the physical control mapped on their PCD to the touched particular virtual slot. These direct-touch widgets are flashed in a highlighted color for a prescribed period of time. This mechanism can be useful in the exemplary situation where a user suspects that another user is controlling the same application control from a different PCD.

3.0 Additional Embodiments

While the PCM technique has been described in more detail by specific reference to embodiments thereof, it is understood that variations and modifications thereof can be made without departing from the true spirit and scope of the PCM technique. By way of example but not limitation, although the PCM technique has been described heretofore in the context of computer embodiments including a shared, durable, touch-sensitive tabletop display surface, the PCM technique is also applicable to computer embodiments including a shared, touch-sensitive display surface which is not configured as a tabletop, such as those configured to be wall-mounted or floor-mounted.

Additionally, although the PCM technique has been described heretofore in the context of the PCDs residing on the display surface and the mapping auras being displayed around the perimeter of the PCDs, an alternate embodiment of the PCM technique is possible where one or more of the PCDs have an integrated display and the continuous virtual slots, discrete virtual slots and mapping control direct-touch buttons are displayed on this integrated display. This embodiment negates the need for such PCDs to reside on the display surface during the dynamic mapping procedure. Another alternate embodiment of the PCM technique is also possible where the mapping aura is projected directed onto the PCDs.

It is also noted that any or all of the aforementioned embodiments can be used in any combination desired to form additional hybrid embodiments. Although the PCM technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

4.0 Computing Environment

This section provides a brief, general description of a suitable computing system environment in which portions of the PCM technique embodiments described herein can be implemented. These PCM technique embodiments are operational with numerous general purpose or special purpose computing system environments or configurations including the aforementioned display surface and camera-based vision subsystem. Exemplary well known computing systems, environments, and/or configurations that can be suitable include, but are not limited to, personal computers (PCs), server computers, laptop devices, multiprocessor systems, microprocessor-based systems, set top boxes, network PCs, minicomputers, mainframe computers, distributed computing environments that include any of the aforementioned systems or devices, and the like.

Figure 6:
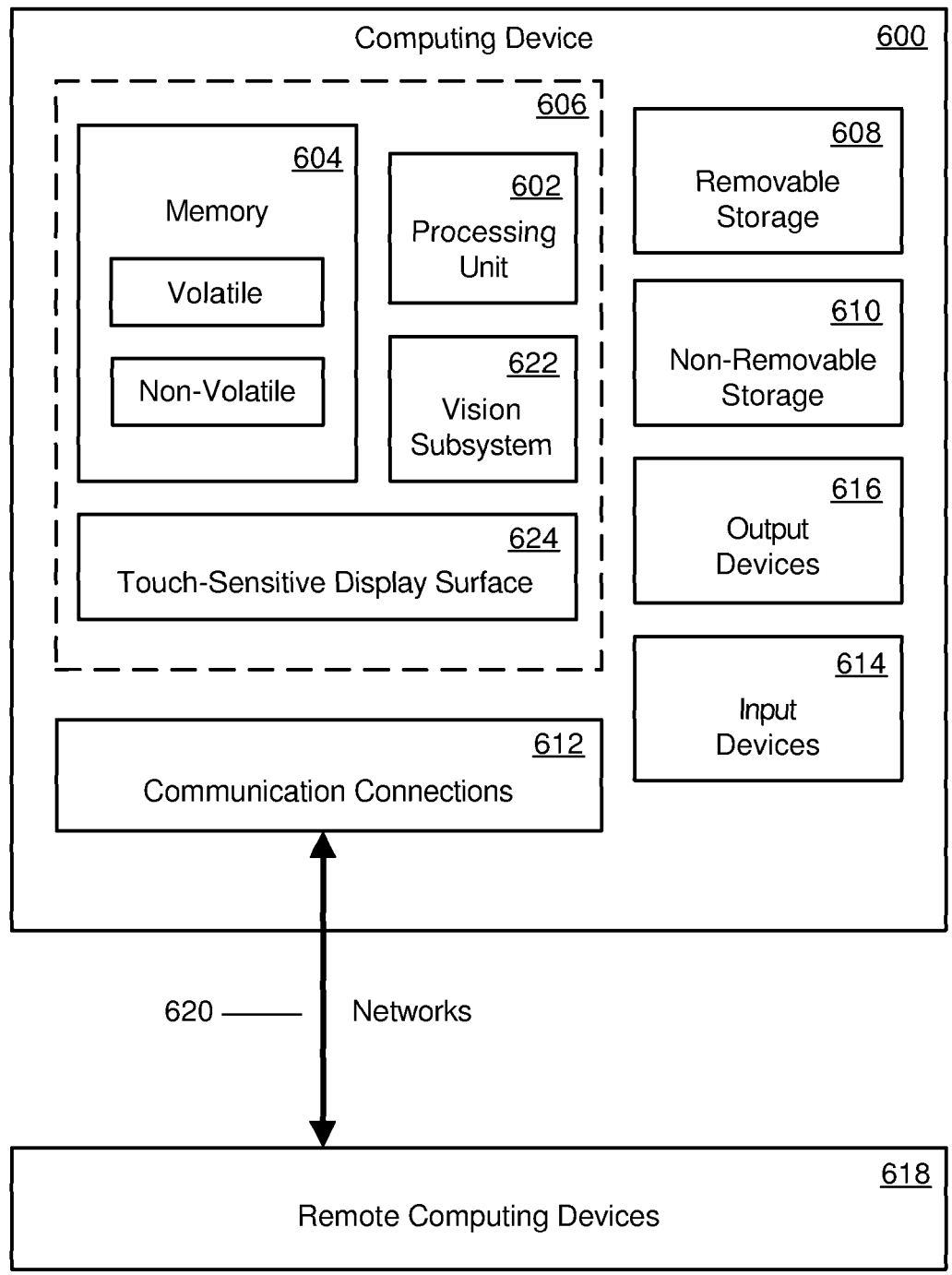
FIG. 6 is a diagram illustrating an exemplary embodiment, in simplified form, of a network-based computing device which constitutes an exemplary system for implementing portions of the PCM technique embodiments described herein.

FIG. 6 illustrates an exemplary embodiment, in simplified form, of a suitable computing system environment according to the PCM technique embodiments described herein. The environment illustrated in FIG. 6 is only one example of a suitable computing system environment and is not intended to suggest any limitation as to the scope of use or functionality of the PCM technique embodiments described herein. Neither should the computing system environment be interpreted as having any dependency or requirement relating to any one or combination of components exemplified in FIG. 6.

As exemplified in FIG. 6, an exemplary system for implementing portions of the PCM technique embodiments described herein includes one or more computing devices, such as computing device 600. In its simplest configuration, computing device 600 typically includes at least one processing unit 602, memory 604, the aforementioned camera-based vision subsystem 622 and the aforementioned touch-sensitive display surface 624. Depending on the specific configuration and type of computing device, the memory 604 can be volatile (such as RAM), non-volatile (such as ROM and flash memory, among others) or some combination of the two. This simplest configuration is illustrated by dashed line 606.

As exemplified in FIG. 6, computing device 600 can also have additional features and functionality. By way of example, computing device 600 can include additional storage such as removable storage 608 and/or non-removable storage 610. This additional storage includes, but is not limited to, magnetic disks, optical disks and tape. Computer storage media typically embodies volatile and non-volatile media, as well as removable and non-removable media implemented in any method or technology. The computer storage media provides for storage of various information needed to operate the device 600 such as computer readable instructions associated with an operating system, application programs and other program modules, and data structures, among other things. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical disk storage technology, magnetic cassettes, magnetic tape, magnetic disk storage or other magnetic storage devices, or any other medium which can be used to store the desired information and which can be accessed by computing device 600. Any such computer storage media can be part of computing device 600.

As exemplified in FIG. 6, computing device 600 can also include one or more communications connections 612 that allow the device to operate in a networked environment and communicate with one or more remote computing devices 618. Each remote computing device 618 can be a PC, a server, a router, a peer device, or other common network node, and typically includes many or all of the elements described herein relative to computing device 600. Communication between computing devices takes place over one or more networks 620, each of which provides a logical connection between the computing devices. Each logical connection can include one or more different types of networks including, but not limited to, local area networks (LANs) and wide area networks (WANs). Such networking environments are commonplace in conventional offices, enterprise-wide computer networks, intranets and the Internet. It will be appreciated that the communications connections 612 and related networks 620 described herein are exemplary and other means of establishing communication between the computing devices can be used.

As exemplified in FIG. 6, communications connections 612 and related networks 620 are an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, radio frequency (RF), infrared, and other wireless media. The term "computer-readable medium" as used herein includes both the aforementioned storage media and communication media.

As exemplified in FIG. 6, computing device 600 can also include one or more input devices 614 and one or more output devices 616. Exemplary input devices 614 include, but are not limited to, a keyboard, mouse, pen and touch input device, whose use is generally limited to system administration related tasks. Exemplary input devices 614 also include a microphone and camera, among others. A user can enter commands and various types of information into the computing device 600 through the input device(s) 614. Exemplary output devices 616 include, but are not limited to, one or more conventional display devices such as monitors or overhead projectors, a printer, and audio output devices, among others. These input and output devices are well known and need not be described at length here.

Referring again to FIG. 6, the PCM technique embodiments described herein can be further described in the general context of computer-executable instructions, such as program modules, which are executed by computing device 600. Generally speaking, program modules include routines, programs, objects, components, and data structures, among other things, that perform particular tasks or implement particular abstract data types. The PCM technique embodiments can also be practiced in a distributed computing environment where tasks are performed by one or more remote computing devices 618 that are linked through one or more communications networks 612/620. In the distributed computing environment, program modules can be located in both local and remote computer storage media including, but not limited to, memory 604 and storage devices 608/610.

Wherefore, what is claimed is:

1. A computer-implemented process for dynamically mapping physical controls on a repositionable physical controller device to application controls for an application being executed on a computer comprising a shared touch-sensitive display surface, comprising using the computer to perform the following process actions:
    upon a user placing a physical controller device (PCD) comprising one or more physical controls on the display surface, recognizing and identifying the PCD and displaying a mapping aura for the PCD;
    upon the user touching an activate direct-touch button which is displayed within the mapping aura,
        activating a mapping procedure for the PCD, and
        displaying a highlighted direct-touch button over each application control displayed on the display surface which is available to be mapped to the physical controls on the PCD; and
    upon the user selecting a particular application control which is available to be mapped by touching the highlighted direct-touch button residing over said particular application control, creating a dynamic mapping between the selected application control and a user-selected physical control on the PCD.

2. The process of claim 1, wherein,
    the display surface comprises a central editor sector within which the application, application controls and highlighted direct-touch buttons are displayed, and wherein a plurality of direct-touch widgets are displayed, each widget corresponding to a particular application control,
    the mapping aura comprises,
        a clipboard area comprising a plurality of virtual clipboard slots, and
        one or more continuous virtual slots, each corresponding to a different continuously adjustable physical control on the PCD,
    the physical controls on the PCD comprise one or more continuously adjustable physical controls, and wherein
    whenever the selected application control is continuously adjustable, the process action of creating a dynamic mapping between the selected application control and a user-selected physical control on the PCD comprises the actions of:
        displaying a copy of the direct-touch widget which corresponds to the selected application control within a particular virtual clipboard slot;
        upon the user touching the particular virtual clipboard slot, displaying a highlight over each of the continuous virtual slots; and
        upon the user touching a highlighted continuous virtual slot,
            clearing the contents of the particular virtual clipboard slot,
            displaying a copy of the direct-touch widget which corresponds to the selected application control within the touched continuous virtual slot, and
            dynamically mapping the selected application control to the particular continuously adjustable physical control which corresponds to the touched continuous virtual slot, wherein said mapping allows the user to dynamically choose to interact with the selected application control either via the particular continuously adjustable physical control, the direct-touch widget displayed within the central editor sector which corresponds to the selected application control, or the copy of the direct-touch widget displayed within the touched continuous virtual slot.

3. The process of claim 2, wherein each continuously adjustable physical control comprises either a rotatable knob or a slider.

4. The process of claim 1, wherein,
    the display surface comprises a central editor sector within which the application, application controls and highlighted direct-touch buttons are displayed, and wherein a plurality of direct-touch widgets are displayed, each widget corresponding to a particular application control,
    the mapping aura comprises,
        a clipboard area comprising a plurality of virtual clipboard slots, and
        one or more discrete virtual slots, each corresponding to a different discretely adjustable physical control on the PCD,
    the physical controls on the PCD comprise one or more discretely adjustable physical controls, and wherein
    whenever the selected application control is discretely adjustable, the process action of creating a dynamic mapping between the selected application control and a user-selected physical control on the PCD comprises the actions of:
        displaying a copy of the direct-touch widget which corresponds to the selected application control within a particular virtual clipboard slot;
        upon the user touching the particular virtual clipboard slot, displaying a highlight over each of the discrete virtual slots; and
        upon the user touching a highlighted discrete virtual slot,
            clearing the contents of the particular virtual clipboard slot,
            displaying a copy of the direct-touch widget which corresponds to the selected application control within the touched discrete virtual slot, and
            dynamically mapping the selected application control to the particular discretely adjustable physical control which corresponds to the touched discrete virtual slot, wherein said mapping allows the user to dynamically choose to interact with the selected application control either via the particular discretely adjustable physical control, the direct-touch widget displayed within the central editor sector which corresponds to the selected application control, or the copy of the direct-touch widget displayed within the touched discrete virtual slot.

5. The process of claim 4, wherein each discretely adjustable physical control comprises either a depressible button or a switch.

6. The process of claim 1, wherein, the display surface comprises a central editor sector within which the application, application controls and highlighted direct-touch buttons are displayed, and wherein a plurality of direct-touch widgets are displayed, each widget corresponding to a particular application control, the physical controls on the PCD comprise one or more continuously adjustable physical controls, and the mapping aura comprises one or more continuous virtual slots, each corresponding to a different continuously adjustable physical control on the PCD, and wherein, whenever the selected application control is continuously adjustable, the process action of creating a dynamic mapping between the selected application control and a user-selected physical control on the PCD comprises the actions of:

upon the user dragging a direct-touch widget associated with the selected application control into a chosen continuous virtual slot, displaying a copy of the direct-touch widget which corresponds to the selected application control within the chosen continuous virtual slot, and dynamically mapping the selected application control to the particular continuously adjustable physical control which corresponds to the chosen continuous virtual slot, wherein said mapping allows the user to dynamically choose to interact with the selected application control either via the particular continuously adjustable physical control, the direct-touch widget displayed within the central editor sector which corresponds to the selected application control, or the copy of the direct-touch widget displayed within the desired continuous virtual slot.

7. The process of claim 1, wherein, the display surface comprises a central editor sector within which the application, application controls and highlighted direct-touch buttons are displayed, and wherein a plurality of direct-touch widgets are displayed, each widget corresponding to a particular application control, the physical controls on the PCD comprise one or more discretely adjustable physical controls, and the mapping aura comprises one or more discrete virtual slots, each corresponding to a different discretely adjustable physical control on the PCD, and wherein whenever the selected application control is discretely adjustable, the process action of creating a dynamic mapping between the selected application control and a user-selected physical control on the PCD comprises the actions of:

upon the user dragging a direct-touch widget associated with the selected application control into a chosen discrete virtual slot, displaying a copy of the direct-touch widget which corresponds to the selected application control within the chosen discrete virtual slot, and dynamically mapping the selected application control to the particular discretely adjustable physical control which corresponds to the chosen discrete virtual slot, wherein said mapping allows the user to dynamically choose to interact with the selected application control either via the particular discretely adjustable physical control, the direct-touch widget displayed within the central editor sector which corresponds to the selected application control, or the copy of the direct-touch widget displayed within the desired discrete virtual slot.

8. The process of claim 1, further comprising using the computer to perform the actions of:

upon the user again touching the activate direct-touch button, deactivating the mapping procedure for the PCD, and returning the application to a normal operating mode.

9. The process of claim 8, wherein, the process action of activating a mapping procedure for the PCD comprises an action of displaying a highlighted halo border around the mapping aura, and the process action of deactivating the mapping procedure for the PCD comprises an action of removing said highlighted halo border.

10. The process of claim 1, wherein the PCD comprises a tag which is located on the bottom of the first PCD and which uniquely identifies the PCD, and wherein the process action of recognizing and identifying the PCD comprises an action of deciphering the tag to uniquely identify the first PCD.

11. The process of claim 1, further comprising using the computer to perform the actions of:

upon a second user placing a second PCD on the display surface, automatically recognizing and identifying the second PCD and displaying a second mapping aura for the second PCD; and upon the second user touching an activate direct-touch button which is displayed within the second mapping aura, deactivating the mapping procedure for the first PCD, and activating a mapping procedure for the second PCD.

12. The process of claim 11, wherein, the process action of activating a mapping procedure for the first PCD comprises an action of displaying a first highlighted halo border around the first mapping aura, the process action of deactivating the mapping procedure for the first PCD comprises an action of removing said first highlighted halo border, and the process action of activating a mapping procedure for the second PCD comprises the actions of, displaying a second highlighted halo border around the second mapping aura, and transferring a current mapping state for the first PCD to the second mapping aura.

13. A system for dynamically mapping physical controls to application controls for an application, comprising:

a plurality of repositionable physical controller devices (PCDs), each PCD comprising one or more physical controls;

a computer comprising a touch-sensitive display surface which is shared by a plurality of collaborating users, wherein the application is executed on the computer, and the application and application controls are displayed on the display surface; and a computer program having program modules executable by the computer, wherein the computing device is directed by the program modules of the computer program to, recognize and identify each PCD placed by the users on the display surface, and create a dynamic mapping between a user-selected application control and a user-selected physical control on a user-selected PCD.

14. The system of claim 13, wherein the computer program further comprises a program module for displaying a mapping aura for each PCD on the display surface, and whenever a user moves their PCD to a new location on the display surface, the mapping aura displayed for their PCD is moved accordingly.

15. The system of claim 14, wherein the program module for displaying the mapping aura comprises displaying a save direct-touch button in the aura, and wherein the computer program further comprises program modules for:
whenever a user touches the save button within the mapping aura for their PCD,
saving a current mapping state for their PCD on the computer,
appending the current mapping state to a mapping history list which is also saved on the computer, said list comprising a chronological listing of each of the saved mapping states for their PCD,
displaying the list within a scrollable sector adjacent to the mapping aura for their PCD, and
upon the user selecting a mapping state from the list, implementing the selected mapping state on their PCD.

16. The system of claim 15, wherein, each PCD further comprises a memory and a communications link with the computer, and whenever a user touches the save button within the mapping aura for a PCD, said mapping history list is transferred to the PCD from the computer via the communications link and saved in the PCD's memory.

17. The system of claim 15, wherein the computer program further comprises program modules for:
whenever a first user drags the displayed mapping history list for their PCD into a mapping aura displayed for the PCD of a second user,
docking the dragged history list to the second mapping aura, and
highlighting the dragged history list and the second mapping aura to visually indicate the docking.

18. The system of claim 14, wherein each mapping aura comprises a delete direct-touch button, and wherein the computer program further comprises a program module for, whenever a user touches the delete button within the mapping aura for their PCD, deleting a particular mapping which was previously created between an application control and a physical control on their PCD.

19. The system of claim 14, wherein each mapping aura comprises a query direct-touch button, and wherein the computer program further comprises a program module for, whenever a user touches the query button within the mapping aura for their PCD, and the user then touches a particular virtual slot of the mapping aura for their PCD, flashing each direct-touch widget displayed on the display surface which corresponds to the application control mapped to the physical control on the PCD associated with the touched particular virtual slot, in a highlighted color, for a prescribed period of time.

20. A computer-implemented process for dynamically mapping physical controls on a repositionable physical controller device to application controls for an application being executed on a computer comprising a shared touch-sensitive display surface, comprising using the computer to perform the following process actions:
upon a user placing a physical controller device (PCD) on the display surface, recognizing and identifying the PCD and displaying a mapping aura for the PCD, wherein,
the PCD comprises one or more continuously adjustable physical controls and one or more discretely adjustable physical controls, and
the mapping aura comprises,
one or more continuous virtual slots, each corresponding to a different continuously adjustable physical control, and
one or more discrete virtual slots, each corresponding to a different discretely adjustable physical control;
upon the user touching an activate direct-touch button which is displayed within the mapping aura, displaying a highlighted direct-touch widget adjacent to each application control displayed on the display surface which is available to be mapped to the physical controls on the PCD;
upon the user selecting a particular application control which is available to be mapped and which is continuously adjustable, by touching the highlighted direct-touch widget displayed adjacent to said particular application control, and upon the user dragging the touched direct-touch widget into a chosen continuous virtual slot displayed in the mapping aura associated with the user's PCD,
displaying a copy of the direct-touch widget which corresponds to the selected application control within the chosen continuous virtual slot, and
dynamically mapping the selected application control to the particular continuously adjustable physical control which corresponds to the chosen continuous virtual slot, wherein said mapping allows the user to dynamically choose to interact with the selected application control either via the particular continuously adjustable physical control, the direct-touch widget displayed adjacent to the selected application control, or the copy of the direct-touch widget displayed within the desired continuous virtual slot; and
upon the user selecting a particular application control which is available to be mapped and which is discretely adjustable, by touching the highlighted direct-touch widget displayed adjacent to said particular application control, and upon the user dragging the touched direct-touch widget into a chosen discrete virtual slot displayed in the mapping aura associated with the user's PCD,
displaying a copy of the direct-touch widget which corresponds to the selected application control within the chosen discrete virtual slot, and
dynamically mapping the selected application control to the particular discretely adjustable physical control which corresponds to the chosen discrete virtual slot, wherein said mapping allows the user to dynamically choose to interact with the selected application control either via the particular discretely adjustable physical control, the direct-touch widget displayed adjacent to the selected application control, or the copy of the direct-touch widget displayed within the desired discrete virtual slot.

* * * * *